(12) United States Patent
Hartmann et al.

(10) Patent No.: US 8,983,706 B2
(45) Date of Patent: Mar. 17, 2015

(54) SAFETY DEVICE FOR MOTOR VEHICLE AND METHOD FOR OPERATING A MOTOR VEHICLE

(75) Inventors: Bernd Hartmann, Bad Homburg (DE); Peter Lauer, Karben (DE); Thomas Raste, Oberursel (DE)

(73) Assignee: Continental Teves AG & Co. oHG, Frankfurt (DE)

(*) Notice: Subject to any disclaimer, the term of this patent is extended or adjusted under 35 U.S.C. 154(b) by 18 days.

(21) Appl. No.: 14/002,419

(22) PCT Filed: Mar. 1, 2012

(86) PCT No.: PCT/EP2012/053515
§ 371 (c)(1),
(2), (4) Date: Sep. 17, 2013

(87) PCT Pub. No.: WO2012/117057
PCT Pub. Date: Sep. 7, 2012

(65) Prior Publication Data
US 2014/0005875 A1 Jan. 2, 2014

(30) Foreign Application Priority Data

Mar. 1, 2011 (DE) .......................... 10 2011 004 879

(51) Int. Cl.
*G08G 1/16* (2006.01)
*B60W 10/06* (2006.01)
(Continued)

(52) U.S. Cl.
CPC .................. *G08G 1/16* (2013.01); *B60W 10/06* (2013.01); *B60W 10/184* (2013.01); *B60W 10/20* (2013.01);
(Continued)

(58) Field of Classification Search
CPC ......... G08G 1/16; G08G 1/161; G08G 1/165; G08G 1/166; G08G 1/167; B60W 10/06; B60W 10/184; B60W 10/20; B60W 30/0953; B60W 30/18145; B60W 2026/022; B60W 50/14; B60W 50/16; B60W 2540/10; B60W 2540/12; B60W 2540/18; B60W 2540/20; B60W 2550/12; B60W 2550/148; B60W 2550/402; B60W 2550/408; B60W 2720/14; Y02T 10/84
USPC ............... 701/23, 25, 70, 74, 80, 93, 96, 300, 701/301; 180/169, 275; 342/70, 71
See application file for complete search history.

(56) References Cited

U.S. PATENT DOCUMENTS 5,694,321 A 12/1997 Eckert et al.
(Continued)

FOREIGN PATENT DOCUMENTS

DE 100 12 737 9/2001
(Continued)

OTHER PUBLICATIONS

International Search Report of the International Searching Authority for International Application PCT/EP2012/053515, mailed May 29, 2012, 3 pages, European Patent Office, HV Rijswijk, Netherlands.
(Continued)

*Primary Examiner* — Richard Camby
(74) *Attorney, Agent, or Firm* — Walter F. Fasse

(57) ABSTRACT

The application relates to a device and a method for increasing the safety of a motor vehicle. A first sensor unit (2) senses the surroundings, in particular in order to detect free spaces and objects (O), and the position and movement thereof. A second sensor unit (20) senses the state of the surroundings, a third sensor unit (30) senses the state of the vehicle, and a fourth sensor unit (40) senses the driver's commands. The data are merged and a driving safety coordinator (6) determines at least one reliable driving corridor (K1, K2, K3, K4 to Kn) predictively and situationally in order to determine the operational safety. The driver's command can be limited to the driving corridor (K1, K2, K3, K4 to Kn) by means of components (9) which can be actuated actively and/or the motor vehicle (1) can be kept in the driving corridor (K1, K2, K3, K4 to Kn) by means of the components (9) which can be actuated actively.

17 Claims, 6 Drawing Sheets

(51) Int. Cl.
  *B60W 10/184* (2012.01)
  *B60W 10/20* (2006.01)
  *B60W 30/095* (2012.01)
  *B60W 30/18* (2012.01)
  *B60K 26/02* (2006.01)
  *B60W 50/14* (2012.01)
  *B60W 50/16* (2012.01)

(52) U.S. Cl.
  CPC ....... *B60W 30/0953* (2013.01); *B60W 30/0956* (2013.01); *B60W 30/18145* (2013.01); *G08G 1/161* (2013.01); *G08G 1/165* (2013.01); *G08G 1/166* (2013.01); *G08G 1/167* (2013.01); *B60K 2026/022* (2013.01); *B60W 50/14* (2013.01); *B60W 50/16* (2013.01); *B60W 2540/10* (2013.01); *B60W 2540/12* (2013.01); *B60W 2540/18* (2013.01); *B60W 2540/20* (2013.01); *B60W 2550/12* (2013.01); *B60W 2550/148* (2013.01); *B60W 2550/402* (2013.01); *B60W 2550/408* (2013.01); *B60W 2720/14* (2013.01); *Y02T 10/84* (2013.01)
  USPC .................. 701/23; 701/80; 701/96; 701/301

(56) References Cited

U.S. PATENT DOCUMENTS

| | | | |
|---|---|---|---|
| 5,711,023 | A | 1/1998 | Eckert et al. |
| 6,017,101 | A | 1/2000 | Matsuda |
| 6,272,418 | B1 | 8/2001 | Shinmura et al. |
| 6,289,281 | B1 | 9/2001 | Shinmura et al. |
| 6,292,753 | B1 | 9/2001 | Sugimoto et al. |
| 6,567,748 | B2 | 5/2003 | Matsuno |
| 6,567,749 | B2 | 5/2003 | Matsuura |
| 6,820,007 | B2 | 11/2004 | Abe et al. |
| 6,926,374 | B2 | 8/2005 | Dudeck et al. |
| 6,959,970 | B2 | 11/2005 | Tseng |
| 6,962,396 | B2 | 11/2005 | Faye et al. |
| 6,968,920 | B2 | 11/2005 | Barton et al. |
| 7,015,805 | B2 | 3/2006 | Knoop et al. |
| 7,035,735 | B2 | 4/2006 | Knoop et al. |
| 7,213,687 | B2 * | 5/2007 | Sakai et al. .................. 188/4 R |
| 7,729,841 | B2 | 6/2010 | Knoop et al. |
| 7,734,418 | B2 | 6/2010 | Shoda et al. |
| 7,739,008 | B2 | 6/2010 | Cieler et al. |
| 7,778,753 | B2 | 8/2010 | Fujiwara et al. |
| 8,086,406 | B2 | 12/2011 | Ewerhart et al. |
| 8,126,626 | B2 | 2/2012 | Zagorski |
| 8,146,703 | B2 * | 4/2012 | Baumann et al. ............. 180/275 |
| 8,255,121 | B2 * | 8/2012 | Zagorski et al. ................ 701/45 |
| 8,392,062 | B2 | 3/2013 | Oechsle et al. |
| 8,423,277 | B2 | 4/2013 | Shirato |
| 8,452,506 | B2 * | 5/2013 | Groult ............................ 701/70 |
| 8,538,674 | B2 | 9/2013 | Breuer et al. |
| 2001/0039472 | A1 | 11/2001 | Isogai et al. |
| 2004/0030497 | A1 | 2/2004 | Knoop et al. |
| 2004/0030498 | A1 | 2/2004 | Knoop et al. |
| 2004/0090117 | A1 | 5/2004 | Dudeck et al. |
| 2004/0158377 | A1 | 8/2004 | Matsumoto et al. |
| 2004/0193374 | A1 | 9/2004 | Hac et al. |
| 2005/0004738 | A1 | 1/2005 | Gronau et al. |
| 2005/0267683 | A1 | 12/2005 | Fujiwara et al. |
| 2006/0100766 | A1 | 5/2006 | Schwarz et al. |
| 2006/0163943 | A1 | 7/2006 | Von Holt et al. |
| 2006/0195231 | A1 | 8/2006 | Diebold et al. |
| 2007/0052530 | A1 | 3/2007 | Diebold et al. |
| 2007/0129891 | A1 | 6/2007 | Yano et al. |
| 2007/0294019 | A1 | 12/2007 | Nishira |
| 2007/0299610 | A1 | 12/2007 | Ewerhart et al. |
| 2008/0046145 | A1 | 2/2008 | Weaver et al. |
| 2008/0208408 | A1 | 8/2008 | Arbitmann et al. |
| 2008/0319610 | A1 | 12/2008 | Oechsle et al. |
| 2009/0212930 | A1 | 8/2009 | Pfeiffer et al. |
| 2009/0222166 | A1 | 9/2009 | Arbitmann et al. |
| 2009/0234543 | A1 | 9/2009 | Groitzsch et al. |
| 2010/0211235 | A1 | 8/2010 | Taguchi et al. |
| 2011/0015818 | A1 | 1/2011 | Breuer et al. |
| 2011/0082623 | A1 | 4/2011 | Lu et al. |
| 2011/0190961 | A1 | 8/2011 | Giebel et al. |
| 2011/0196576 | A1 | 8/2011 | Staehlin |
| 2012/0065861 | A1 | 3/2012 | Hartmann et al. |
| 2013/0338878 | A1 | 12/2013 | Fritz et al. |
| 2014/0074388 | A1 | 3/2014 | Bretzigheimer et al. |

FOREIGN PATENT DOCUMENTS

| | | |
|---|---|---|
| DE | 100 60 498 | 10/2001 |
| DE | 102 31 556 | 1/2003 |
| DE | 103 16 413 | 10/2004 |
| DE | 103 34 203 | 3/2005 |
| DE | 102005002760 | 8/2005 |
| DE | 102004060053 | 12/2005 |
| DE | 102005031854 | 2/2006 |
| DE | 102004056120 | 5/2006 |
| DE | 102004059002 | 6/2006 |
| DE | 102005003177 | 7/2006 |
| DE | 102005004394 | 8/2006 |
| DE | 102005035624 | 2/2007 |
| DE | 102005037479 | 2/2007 |
| DE | 102006036921 | 4/2007 |
| DE | 102005062275 | 6/2007 |
| DE | 102006057744 | 7/2008 |
| DE | 102009017152 | 12/2009 |
| DE | 102008040241 | 1/2010 |
| DE | 102009020649 | 11/2010 |
| EP | 1 600 321 | 11/2005 |
| EP | 1 735 187 | 12/2006 |
| EP | 1 977 946 | 10/2008 |
| JP | 2007-022232 A | 2/2007 |
| WO | WO 2004/103798 | 12/2004 |
| WO | WO 2005/080133 | 9/2005 |
| WO | WO 2006/045826 | 5/2006 |

OTHER PUBLICATIONS

PCT International Preliminary Report on Patentability including English Translation of PCT Written Opinion of the International Searching Authority for International Application PCT/EP2012/053515, issued Sep. 3, 2013, 11 pages, International Bureau of WIPO, Geneva, Switzerland.

German Search Report for German Application No. 10 2012 203 182.0, dated Sep. 28, 2012, 5 pages, Muenchen, Germany, with English translation, 5 pages.

* cited by examiner

SAFETY DEVICE FOR MOTOR VEHICLE AND METHOD FOR OPERATING A MOTOR VEHICLE

This invention relates to a safety device for a motor vehicle with
- at least one sensor unit for detecting the environmental conditions and for the output of environmental data, an evaluation unit for merging the environmental data and an evaluation unit for detecting free spaces and objects, and the position and movement thereof, and with
- at least one sensor unit for detecting the state of the environment and for the output of environmental status data and an evaluation unit for merging the environmental data with the environmental status data to determine a proposed coefficient of friction, and with
- at least one sensor unit for detecting the vehicle state and for the output of vehicle status data and an evaluation unit for merging the vehicle status data with driver input data to determine the driving state, and with
- at least one sensor unit for detecting the driver inputs and for the output of driver input data and an evaluation unit for merging the driver input data with the vehicle status data to determine the driver's setpoint course. The invention further relates to a method for operating a motor vehicle.

Such a safety device and method for increasing safety in road traffic is known from EP 1 735 187 A1. In the known system, a supporting driving maneuver is determined during or after a steering action as part of an avoidance maneuver initiated by the driver, wherein the driver input can be overridden at any time. This known method determines based on environmental signals if a critical situation with respect to driving dynamics exists or if a collision is imminent. The method is preferably used for avoidance maneuvers in emergency situations.

It is the object of the present invention to introduce a method which, taking into account the driving situation, proactively ensures maximum driving safety that supports the driver in his or her driving job as best as possible.

This object is achieved by a method and device having the features of the independent claims. A driving safety coordinator predictively and situatively determines at least one permissible driving corridor in order to ensure operational safety and restricts the driver input to the driving corridor using actively addressable components and keeps the motor vehicle in the driving corridor using the actively addressable components. This measure predictively and situatively protects the driver and the vehicle and/or vehicle systems from dangerously exceeding the limits of driving physics and considerably increases road safety. Collisions are reliably avoided in situations of an increased accident risk. Depending on the degree of automation, the system can operate with or without being initiated by the driver. The driver should be able to specify a driver input, which the control system can modify based on system and situational conditions. An example of a highly automated system is the landing of an airplane in heavy weather using a differential GPS system, a map of the runway and altitude and speed measurements, wherein an autopilot translates and adjusts the flight path and flight dynamics to a target corridor. A system at a low degree of automation would just warn the pilot when he or she leaves the predicted target corridor.

In an advantageous development of the subject matter of the invention, the driving safety coordinator evaluates the pool of the data obtained with respect to the criticality of the driving situation and is configured to output a warning to the driver and/or the environment.

The area of the permissible driving corridor is delimited both by spatial and situational boundaries and by limits of driving physics within a predicted avoidance area. This measure considers the area required for the situation and the area required in terms of driving physics within the avoidance area in order to determine at least one driving corridor.

In an advantageous development, the driving safety coordinator is configured to actuate the actively addressable components such that a counterforce is generated at the accelerator pedal or an intervention in the driving engine, an intervention in the power train, or a braking intervention is performed to keep the vehicle in the driving corridor. This measure actuates the actively addressable components, which are also called externally addressable components, such that the vehicle is kept in the driving corridor, either actively or by influencing the driver. The driving safety coordinator is configured to actuate the actively addressable components such that an additional steering torque and/or additional steering angle or a braking intervention aimed at individual wheels is generated to generate a yaw moment to keep the vehicle in the driving corridor. In a special embodiment, the driver can override any actuation of actively addressable components to restrict the vehicle to the driving corridor at any time.

In a further development, the driving safety coordinator is configured to issue a haptic, acoustic and/or optical warning to the driver. In yet another development, the driving safety coordinator is configured to initiate an emergency brake operation if the permissible driving corridors provide no avoidance option and the collision risk is high. An intervention by the driving safety coordinator can therefore range from a warning to the driver to an automated or autonomously performed driving maneuver.

The sensor unit for detecting the environment and for the output of environmental data consists of a radar, lidar, or camera system or of a combination of the aforementioned systems. In addition, the sensor unit takes other information into account that is transmitted via car-to-x communication when detecting the environmental conditions and outputting environmental data.

The at least one sensor unit for detecting an environmental state is formed by a rain sensor, a thermoelement and/or a camera system.

The at least one sensor unit for detecting the vehicle state consists of a wheel speed sensor, a lateral acceleration sensor, a longitudinal acceleration sensor, and/or a yaw rate sensor.

The at least one sensor unit for detecting the driver input is formed by a steering angle sensor, a pedal angle sensor for the brake pedal and/or the accelerator pedal and/or a transmitter of the direction indicator.

All evaluation units are configured to perform a data merger by pooling and completing incomplete records for data cleansing.

The object is also achieved by a device having the features of the coordinate claim. A permissible driving corridor is determined predictively and situatively, taking into account operational safety, and the motor vehicle is kept in this driving corridor in that the driver input is restricted to the driving corridor using actively addressable components.

The invention will be explained in more detail below, with reference to an embodiment and the enclosed figure. Wherein.

Figure 4A:
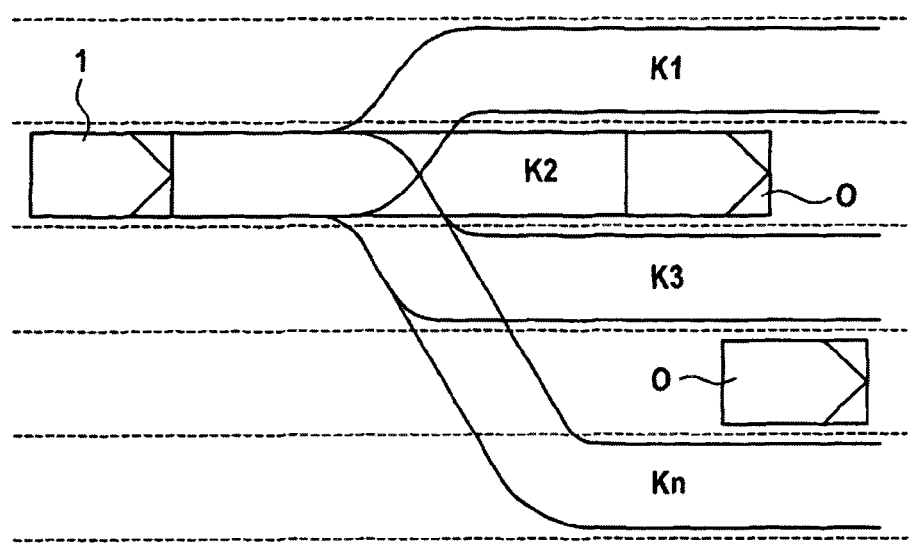
Figure 5:
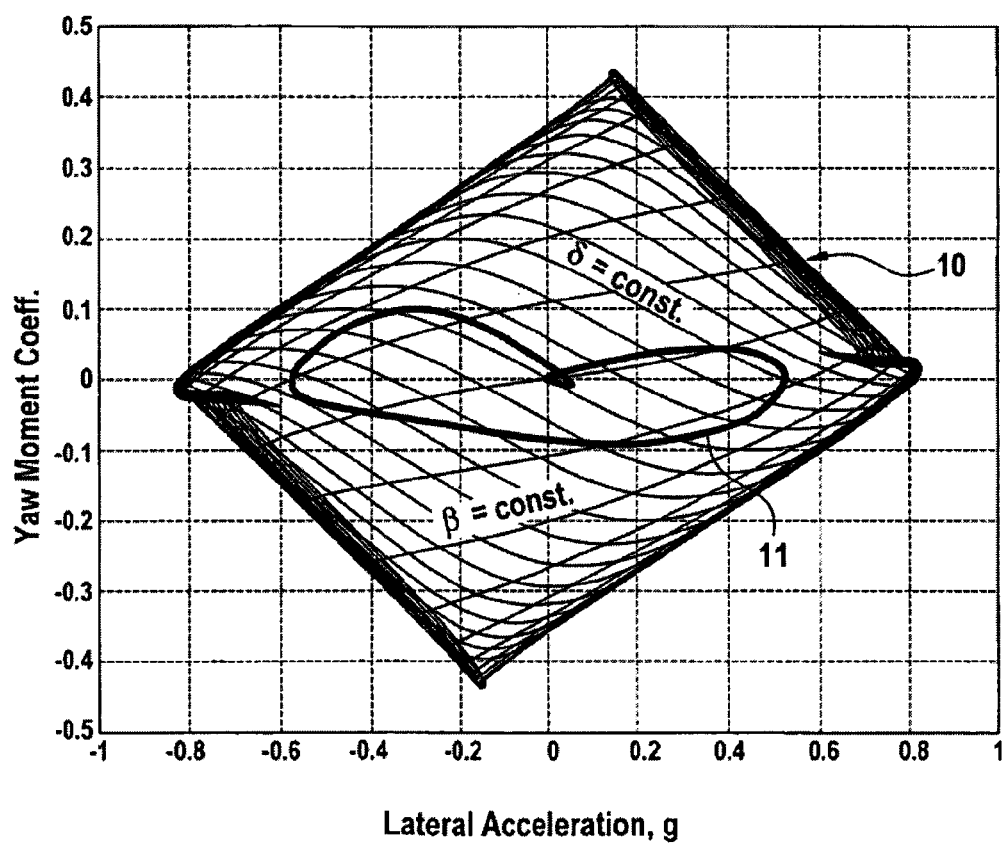
Figure 6:
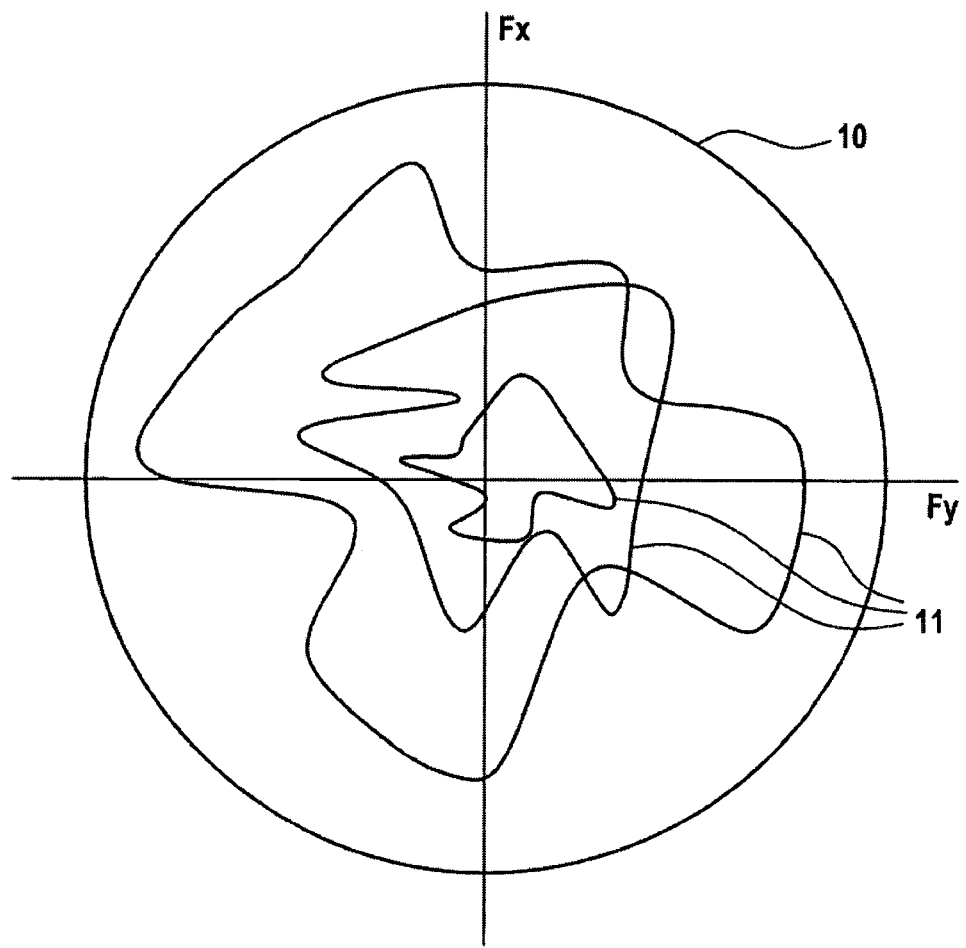

FIG. 4a,b shows a schematic of permissible driving corridors;

FIG. 5 shows a graphic comparison of the lateral acceleration and the yaw moment of the vehicle, and FIG. 6 shows a view of the longitudinal and transverse forces of a vehicle tire.

The term "steering wheel" in the meaning of this invention represents all conceivable man-machine interfaces that a driver can operate for steering and driving the motor vehicle, such as switch inputs, a joystick or a touch pad, as well as remotely transmitted actuator commands.

A safety device for motor vehicles in general will be explained with reference to FIGS. 1 and 2 and an embodiment of the invention will be explained with reference to FIGS. 3 and 4 below.

Figure 1:
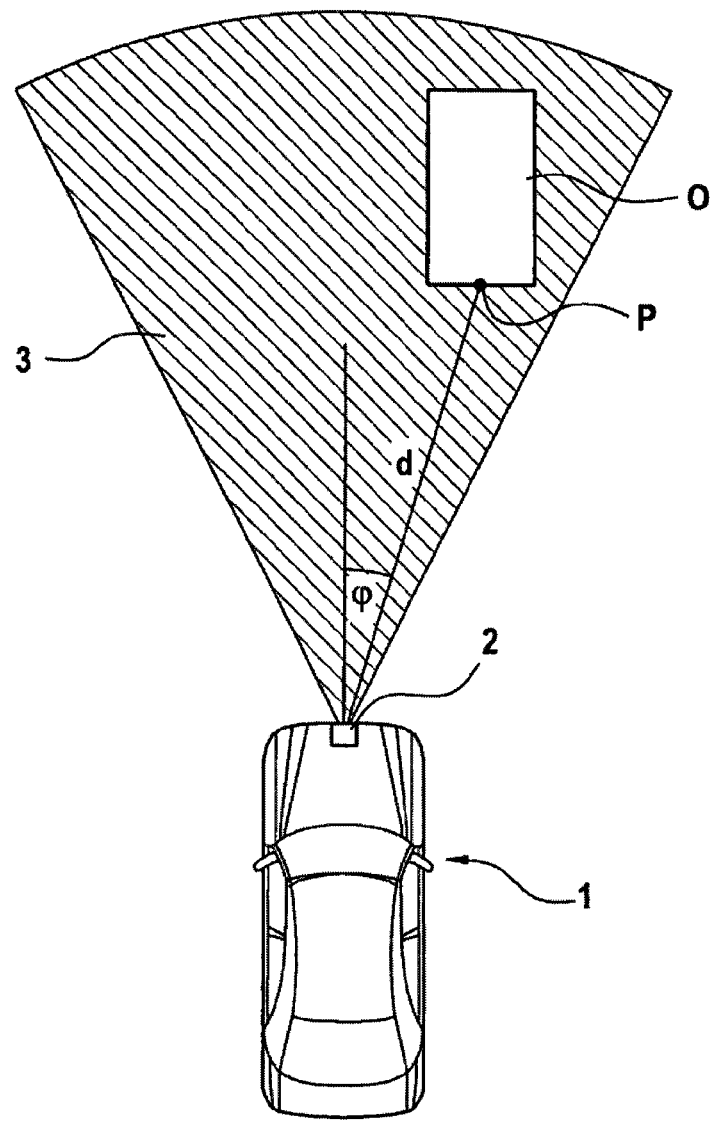
FIG. 1 shows a schematic of a vehicle with environment sensors for detecting objects in the environment of the vehicle.

FIG. 1 shows an example of a four-wheel, two-axle vehicle 1 that has environment sensors 2 with which objects O in the environment of the vehicle can be detected, which in particular are other vehicles in the same or a neighboring traffic lane to the side from, and/or in front of, the vehicle. Objects O can also be static or almost static objects such as trees, pedestrians, or roadside borders. An example of environment sensors 2 is shown with a detection range 3 that captures a solid angle in front of, next to, or behind the vehicle 1 in which an exemplary object O is shown. The one or more environment sensors 2 may, for example, comprise a LIDAR (Light Detection and Ranging) sensor that is generally known to a person skilled in the art. Other environment sensors such as radar sensors or optical camera systems can also be used. Furthermore, the information about the environment can be detected using so-called car-to-x communication. This means transmission of environmental information from other vehicles or detection points to the vehicle 1. The environment sensors 2 measure the distances d to the detected points of an object and the angles φ between the connecting lines to these points and the central longitudinal axis of the vehicle, as shown by way of example in FIG. 1 for a point P of the object O. The fronts of the detected objects that face towards the vehicle are composed of multiple acquired points, for which sensor signals are transmitted that establish correlations between points and the shape of an object and determine a reference point for the object O. For example, the center of the object O or the center of the acquired points of the object can be selected as the reference point. Unlike a radar sensor (Doppler effect), a LIDAR environment sensor 2 cannot directly measure the speeds of the detected points and therefore the speed of the detected objects. They are calculated from the difference between the distances measured at subsequent time steps in a cyclically operating object recognition unit 21. Acceleration of the objects can in principle be determined in a similar way by deriving their positions two times.

Figure 2:
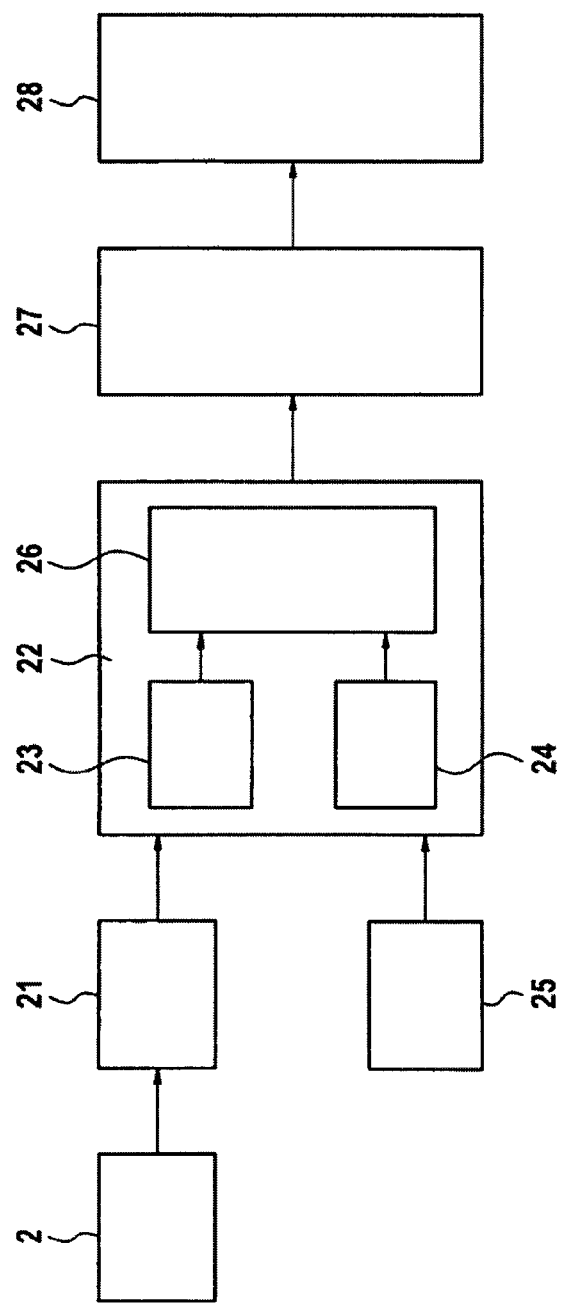
FIG. 2 shows a schematic of a driver assistance system.

FIG. 2 shows a diagram of a driver assistance system whose components, except for sensors and actuators and other hardware, are preferably made up of software modules that are executed using a microprocessor inside the vehicle 1. As shown in FIG. 2, object data in the form of electronic signals is transmitted to a decision means 22 within the block diagram of the driver assistance system. The decision means 22 determines an object trajectory based on the information about the object O in block 23. In addition, it determines a movement trajectory T of the vehicle 1 in block 24 based on information about the dynamic status of the vehicle 1 that can be obtained using other vehicle sensors 25. Information used particularly includes the vehicle speed that can be determined using wheel speed sensors, the steering angle δ measured using a steering angle sensor on the steerable wheels of the vehicle 1, the yaw rate and/or lateral acceleration of the vehicle 1 that are measured using respective sensors. It is further possible to calculate or estimate model-based variables from the dynamic vehicle states measured using the vehicle sensors 25. An indication of the coefficient of friction between the tires of the vehicle 1 and the road is also obtained from the vehicle sensors or from the condition of the road surface. This proposed coefficient of friction is in particular determined by the brake control system. The decision means 22 then checks in block 26 if the motor vehicle 1 is on a collision course with one of the detected objects O. If such a collision course is found and the collision time, i.e. the time before the detected collision with the object O will occur, which is also determined by the decision means, falls below a specific value, a trigger signal is sent to a path control means 27. The trigger signal initially triggers the calculation of an evasive path, i.e. a movement trajectory T, in the path control means. Then a starting point for the evasive maneuver is determined based on the evasive path or movement trajectory T determined, which is the point at which the evasive maneuver must be started to be able to just avoid the object O. These steps are preferably repeated in time increments until there is no more collision risk due to course changes of the object O or the vehicle 1 or until the vehicle 1 reaches the starting point for an evasion maneuver. If this is the case, the evasive path or parameters representing this path are sent to a steering actuator control means 28.

Figure 3:
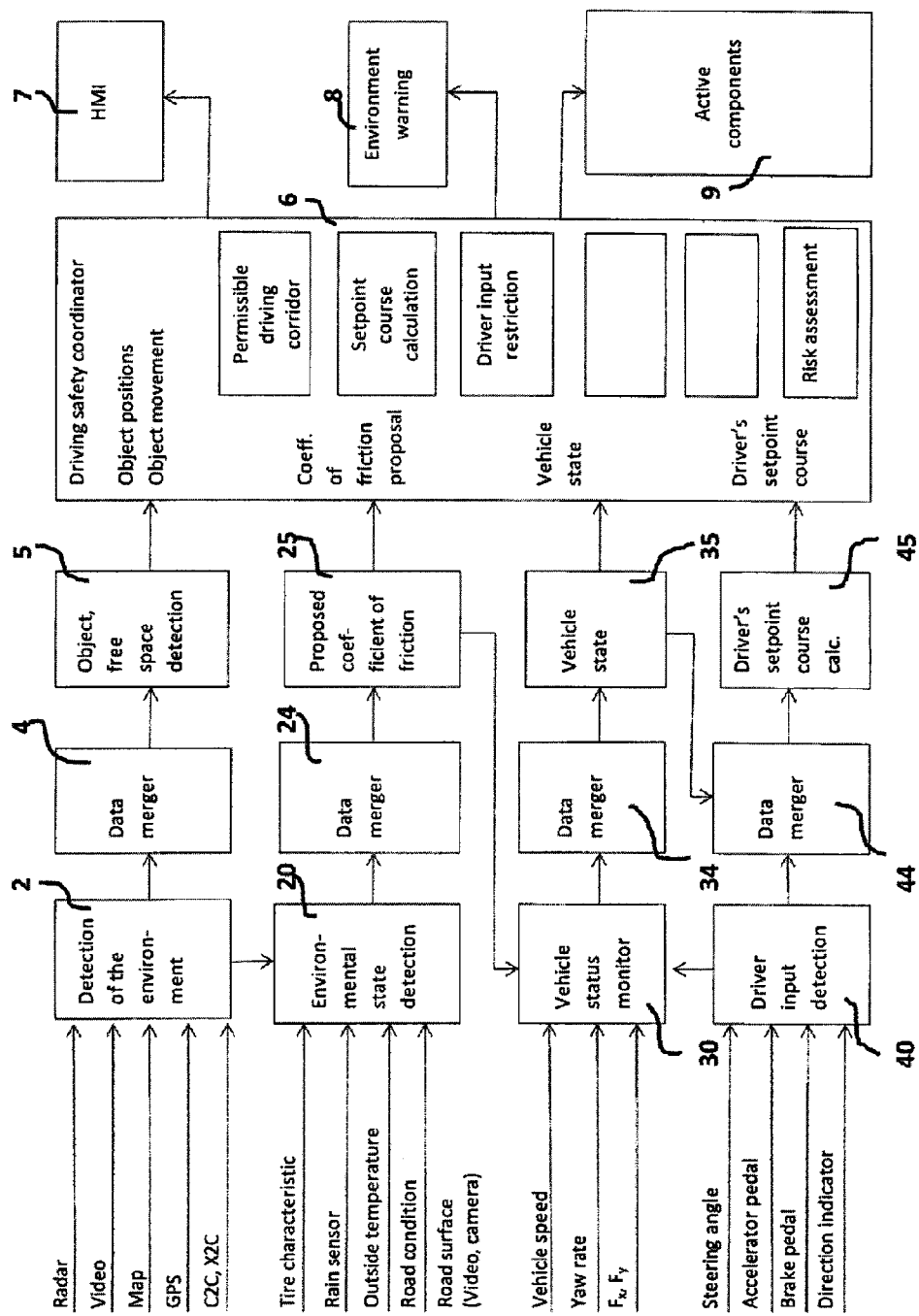
FIG. 3 shows a block diagram of the safety device according to the invention.

FIG. 3 shows a schematic of the safety device according to the invention. The underlying idea is the interconnection of the various sensor units 2, 20, 30, 40. A data merger is performed using the data available from the sensor units 2, 20, 30, 40. A data merger is the pooling and completion of incomplete records for data cleansing. Several records, some of which are incomplete, must be combined to obtain a complete picture of the environment. Before data of the records from two sensor units 2, 20, 30, 40 can be merged, the data must be brought into a joint data schema. This process is also called data schema integration. The data merger makes it possible to obtain information on the environment of the vehicle 1 at improved data quality. Improved data quality means more accurate and faster calculation of the permissible driving corridors K1, K2, K3, K4 to Kn. As is explained below, data is also merged to obtain improved information on the condition of the environment, the vehicle state and driver input.

At least one sensor unit 2 is used to detect the environmental conditions. As stated above, this system of environment sensors 2 is comprised of a radar, lidar, or video camera system or a combination thereof. The information obtained using at least one of these sensor units 2 is pooled with map information, GPS data and information received using car-to-x communication to obtain an environmental information pool in an evaluation unit 4. After the merger of the data, the improved environmental data is evaluated with the purpose of detecting objects O. The position and movement information of an object O is sent to a driving safety coordinator 6. This driving safety coordinator 6 determines a permissible driving corridor K1, K2, K3, K4 to Kn based on limits of driving physics and taking into account the environment data and thus predictively and situatively ensures the operational safety of the vehicle 1. The permissible driving corridors K1, K2, K3, K4 to Kn will be explained in more detail below with reference to FIG. 4.

As can further be derived from FIG. 3, at least one other sensor unit 20 is used to detect the state of the surroundings. This at least one sensor unit 20 for detecting an environmental state is formed by a rain sensor, a thermoelement and/or a camera system. The environmental status information detected and the tire characteristic of the vehicle tires used are merged in the evaluation unit 24, and a proposed coefficient of friction between the tires and the road surface is determined from the cleansed environment data in step 25. The proposed coefficient of friction may for example be based on knowledge of the condition of the road surface. The determined coefficient of friction proposal is also forwarded to the driving safety coordinator 6.

Another at least one sensor unit 30 is used to detect the vehicle state. The at least one sensor unit 30 for detecting the vehicle state consists of a wheel speed sensor, a lateral acceleration sensor, a longitudinal acceleration sensor, and/or a yaw rate sensor. A combination of the sensors mentioned is also conceivable. The sensor unit 30 for detecting the vehicle state is also called vehicle status monitor. An evaluation unit 34 associated with the vehicle status monitor combines the vehicle status data with the determined coefficient of friction proposal in the form of a data merger. The vehicle status is calculated in this way in step 35 and output to the driving safety coordinator 6.

As FIG. 3 also discloses, at least one other sensor unit 40 is provided to detect driver input and to output driver input data. This at least one sensor unit 40 for detecting the driver input is formed by a steering angle sensor, a pedal angle sensor for the brake pedal and/or the accelerator pedal and/or a transmitter of the direction indicator. The transmitter of the direction indicator is colloquially referred to as a flasher. The information says if the driver wants to turn left or right. The vehicle status information just determined is sent to the evaluation unit 44 and merged there with the driver input data. Since the data merger means pooling and completion of incomplete records, it results in data cleansing, and a precise driver's setpoint course is calculated in step 45 and output to the driving safety coordinator 6.

Thus the position and movement of the object O and the determined coefficient of friction proposal are transmitted to the driving safety coordinator 6. The driving safety coordinator 6 also receives information about the vehicle state and the driver's setpoint course. These data are used to determine a permissible driving corridor K1, K2, K3, K4 to Kn. To illustrate the permissible driving corridors K1, K2, K3, FIG. 4a shows the vehicle 1 and the object O that is located in the driving direction. The driving corridors K1, K3 shown in this example were situatively and predictively determined and bypass the object O on its left and right within the predicted avoidance space. The corridor K2 marks an area in front of the object O without an avoidance path if an emergency brake operation suffices to avoid a collision with the object O. This means that the driving safety coordinator 6 will initiate an emergency brake operation if the permissible driving corridors K1 and K3, Kn do not provide an avoidance option and the collision risk is high. In this case, the corridor K2 will serve as the brake path.

Figure 4B:
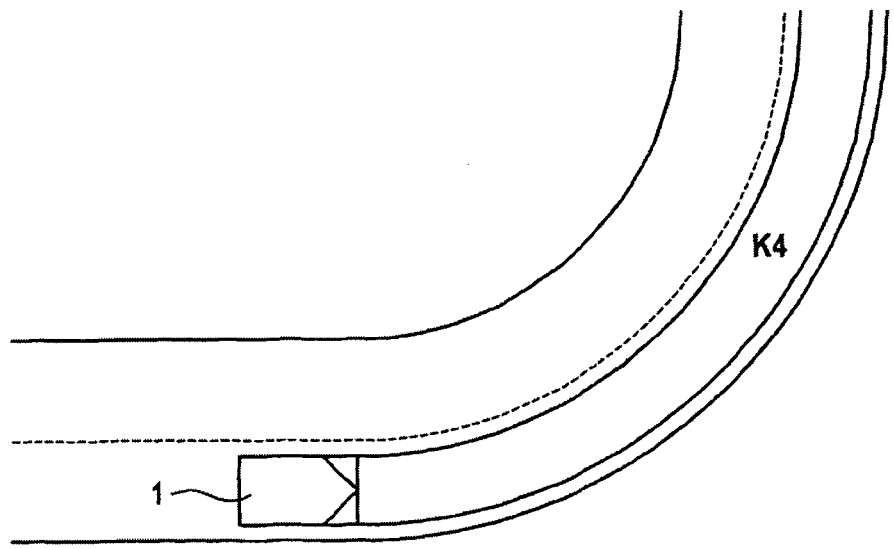

FIG. 4b shows another exemplary driving situation. There is no object O in the driving direction of vehicle 1. Instead, the predicted avoidance area represents driving through a bend and the permissible driving corridor K4 is plotted within the predicted free driving space. It becomes clear that this method and safety device is not limited to emergency situations like imminent collisions but is also utilized in normally harmless driving situations to minimize such emergency situations and support the driver in his or her driving job.

The operation of the driving safety coordinator 6 to keep the vehicle 1 in its permissible driving corridors K1, K2, K3, K4 to Kn will now be explained in more detail with reference to FIG. 3. As mentioned above, the position and movement information of an object or objects O and the determined coefficient of friction proposal are transmitted to the driving safety coordinator 6. The driving safety coordinator 6 also receives information about the vehicle state and the driver's setpoint course. These data are used to determine a permissible driving corridor K1, K2, K3, K4 to Kn and to calculate a setpoint course for the vehicle 1. To keep the vehicle 1 in the permissible corridor K1, K2, K3, K4 to Kn, active components 9 are actuated such that the driver input is restricted to the available corridor K1, K2, K3, K4 to Kn. These actively addressable components 9 are located in the chassis or in a man-machine interface such as brake pedal, driving engine, steering system, transmission, shock absorber, stabilizer, or direction indicator. The driving safety coordinator 6 actuates the actively addressable components 9 such that a counterforce is generated in the accelerator pedal, an intervention in the driving engine, an intervention in the power train, or a braking interventions is performed to keep the vehicle in the driving corridor K1, K2, K3, K4 to Kn. Alternatively, or in addition, the actively addressable components 9 are actuated such that an additional steering torque and/or additional steering angle or a braking intervention aimed at individual wheels is generated to generate a yaw moment. This actuation is also suited to keep the vehicle in the driving corridor K1, K2, K3, K4 to Kn. In a special embodiment, the driver can override each action of the system, so that the driver keeps control over his or her vehicle 1.

As can further be derived from FIG. 3, the driving safety coordinator 6 evaluates the data obtained with respect to the criticality of the driving situation and, if required, issues a warning to the driver and/or the environment. This environment warning 8 may be optical, acoustic, or issued using car-to-x communication. Car-to-x communication can also be used to output the environment warning 8 to the infrastructure and to other vehicles. The driver is warned via a man-machine interface 7, also called human machine interface or in short HMI. The driver can be warned by haptic, acoustic, or optical means. All addressable components of the man-machine interface 7 are suitable, such as a counterforce on the accelerator pedal or a vibration of the steering wheel. Warning lamps and acoustic warnings are also suitable for warning the driver of the vehicle.

FIG. 5 shows the yaw moment over the longitudinal acceleration a. At a constant steering angle 5 and constant side-slip angle the physical limit 10 and the permissible range 11. The driving corridors are always plotted within the physical limit 10 and the permissible range 11. The physical limit 10 is also illustrated in FIG. 6: The frictional forces $F_x$, $F_y$ of the tire in the longitudinal and transverse direction comprise a physical limit above which the tire will no longer adhere to the road. The vehicle no longer has sufficient contact with the road, and the driver can easily lose control of his or her vehicle. Multiple permissible variants are shown within the physical limit 10.

The evaluation units 4, 5, 24, 25, 34, 35, 44, 45 may also be designed as software components or process steps of a method within a common evaluation unit.

The invention claimed is:

1. A safety device for a motor vehicle (1) with at least one sensor unit (2) for detecting the environmental conditions and for the output of environmental data, an evaluation unit (4) for merging the environmental data and an evaluation unit (5) for detecting free spaces and objects (O), and the position and movement thereof, and with at least one sensor unit (20) for detecting the state of the environment and for the output of environmental status data and an evaluation unit (24) for merging the environmental data with the environmental status data to determine a proposed coefficient of friction, and with at least one sensor unit (30) for detecting the vehicle state and for the output of vehicle status data and an evaluation unit (34) for merging the vehicle status data with the proposed coefficient of friction and the driver input data to determine the driving state, and with at least one sensor unit (40) for detecting the driver inputs and for the output of driver input data and an evaluation unit (44) for merging the driver input data with the vehicle status data to determine the driver's setpoint course, characterized in that a driving safety coordinator (6) predictively and situatively determines at least one permissible driving corridor (K1, K2, K3, K4 to Kn) in order to ensure operational safety and restricts the driver input to the driving corridor using actively addressable components (9) and keeps the motor vehicle (1) in the driving corridor (K1, K2, K3, K4 to Kn) using the actively addressable components (9).

2. The safety device according to claim 1, characterized in that the driving safety coordinator (6) evaluates the pool of the data obtained with respect to the criticality of the driving situation and is configured to output a warning to the driver and/or the environment.

3. The safety device according to claim 1, characterized in that the area of the permissible driving corridor (K1, K2, K3, K4 to Kn) is delimited both by spatial and situational boundary lines and by limits of driving physics within a predicted avoidance area.

4. The safety device according to claim 1, characterized in that the driving safety coordinator (6) actuates the actively addressable components (9) such that a counterforce is generated in the accelerator pedal, an intervention in the driving engine, an intervention in the power train, or a braking intervention is performed to keep the vehicle in the driving corridor (K1, K2, K3, K4 to Kn).

5. The safety device according to claim 1, characterized in that the driving safety coordinator (6) actuates the actively addressable components (9) such that an additional steering torque and/or additional steering angle or a braking intervention aimed at individual wheels is generated to generate a yaw moment to keep the vehicle in the driving corridor (K1, K2, K3, K4 to Kn).

6. The safety device according to claim 5, characterized in that the driver can override the actuation by the actively addressable components (9) that restricts the vehicle to the driving corridor (K1, K2, K3, K4 to Kn) at any time.

7. The safety device according to claim 1, characterized in that the driving safety coordinator (6) is configured to issue a haptic, acoustic and/or optical warning to the driver.

8. The safety device according to claim 1, characterized in that the driving safety coordinator (6) is configured to initiate an emergency brake operation when the permissible driving corridors (K1, K2, K3, K4 to Kn) provide no avoidance option and the collision risk is high.

9. The safety device according to claim 1, characterized in that a driving maneuver is performed in an automated or autonomous manner.

10. The safety device according to claim 1, characterized in that the at least one sensor unit (2) for detecting the environmental conditions and for the output of environmental data consists of a radar, lidar, or camera system.

11. The safety device according to claim 10, characterized in that the at least one sensor unit (2) takes into account other information may be transmitted using car-to-X communication for the detection of the environmental conditions and for the output of environmental data.

12. The safety device according to claim 1, characterized in that the at least one sensor unit (20) for detecting the environmental state is formed by a rain sensor, a thermoelement, and/or by a camera system.

13. The safety device according to claim 1, characterized in that the at least one sensor unit (30) for detecting the vehicle state consists of a wheel speed sensor, a lateral acceleration sensor, a longitudinal acceleration sensor, and/or a yaw rate sensor.

14. The safety device according to claim 1, characterized in that the at least one sensor unit (40) for detecting the driver input is formed by a steering angle sensor, a pedal angle sensor for the brake pedal and/or the accelerator pedal and/or a transmitter of the direction indicator.

15. The safety device according to claim 1, characterized in that the evaluation units (4, 24, 34, 44) are configured to perform a data merger by pooling and completing incomplete records for data cleansing.

16. A method for operating a motor vehicle (1) with at least one sensor unit (2) for detecting the environmental conditions and for the output of environmental data, an evaluation unit (4) for merging the environmental data and an evaluation unit (5) for detecting free spaces and objects (O), and the position and movement thereof, and with at least one sensor unit (20) for detecting the state of the environment and for the output of environmental status data and an evaluation unit (24) for merging the environmental data with the environmental status data to determine a proposed coefficient of friction, and with at least one sensor unit (30) for detecting the vehicle state and for the output of vehicle status data and an evaluation unit (34) for merging the vehicle status data with the proposed coefficient of friction and the driver input data to determine the driving state, and with at least one sensor unit (40) for detecting the driver inputs and for the output of driver input data and an evaluation unit (44) for merging the driver input data with the vehicle status data to determine the driver's setpoint course, characterized in that a permissible driving corridor (K1, K2, K3, K4 to Kn) is predictively and situatively determined in order to ensure operational safety and that the motor vehicle (1) is kept in the driving corridor (K1, K2, K3, K4 to Kn) in that the driver input is restricted to the driving corridor using actively addressable components (9).

17. The safety device according to claim 4, characterized in that the driver can override the actuation by the actively addressable components (9) that restricts the vehicle to the driving corridor (K1, K2, K3, K4 to Kn) at any time.

* * * * *